Sept. 16, 1941.  D. HEYER  2,256,114
VARIABLE SPEED DRIVE WITH MULTIPLE BELTS
Original Filed April 22, 1933  2 Sheets-Sheet 2
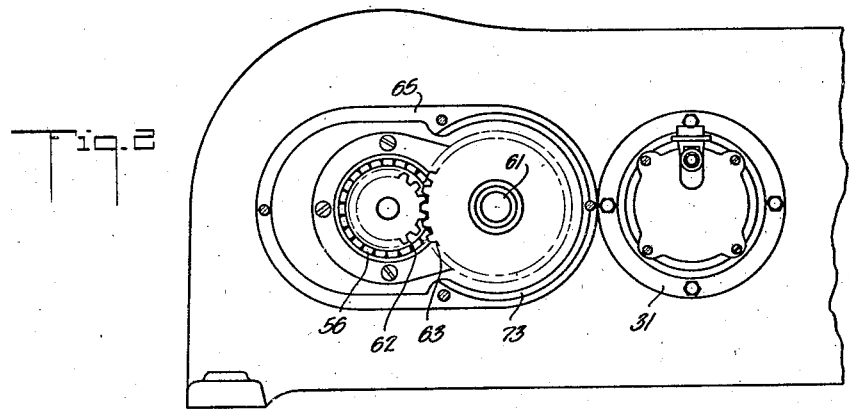
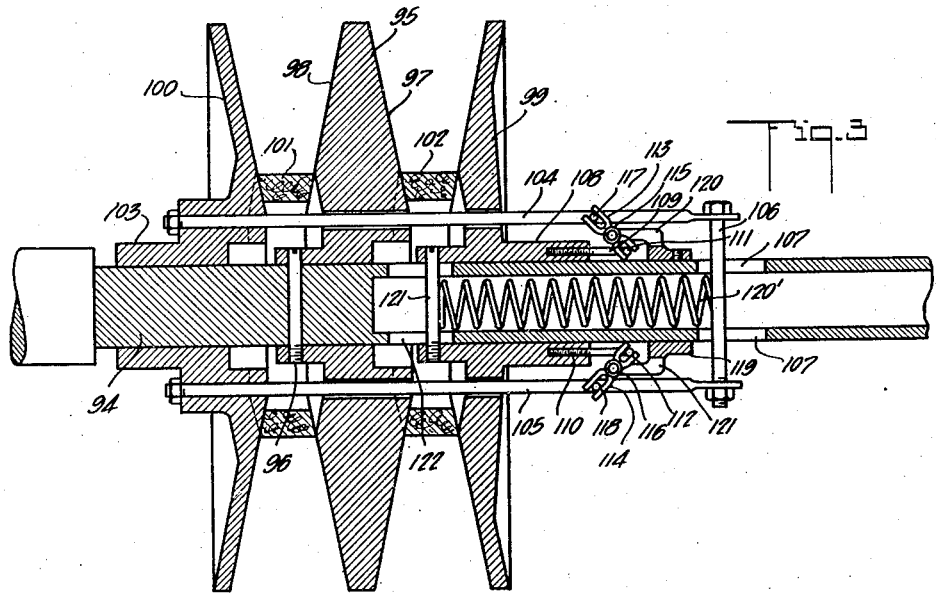
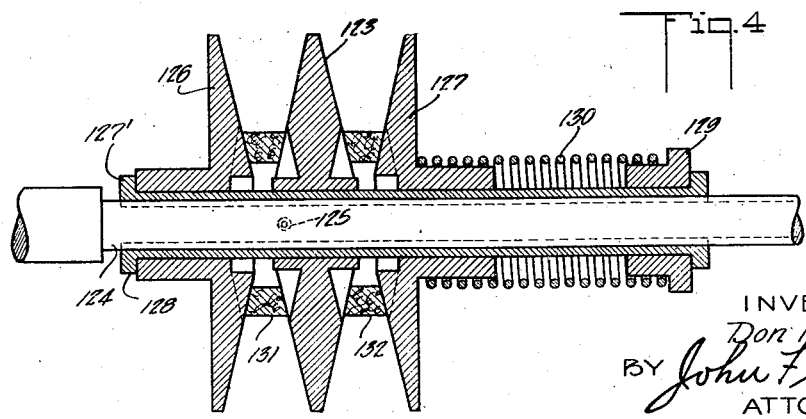
INVENTOR
Don Heyer
BY John Flam
ATTORNEY Patented Sept. 16, 1941

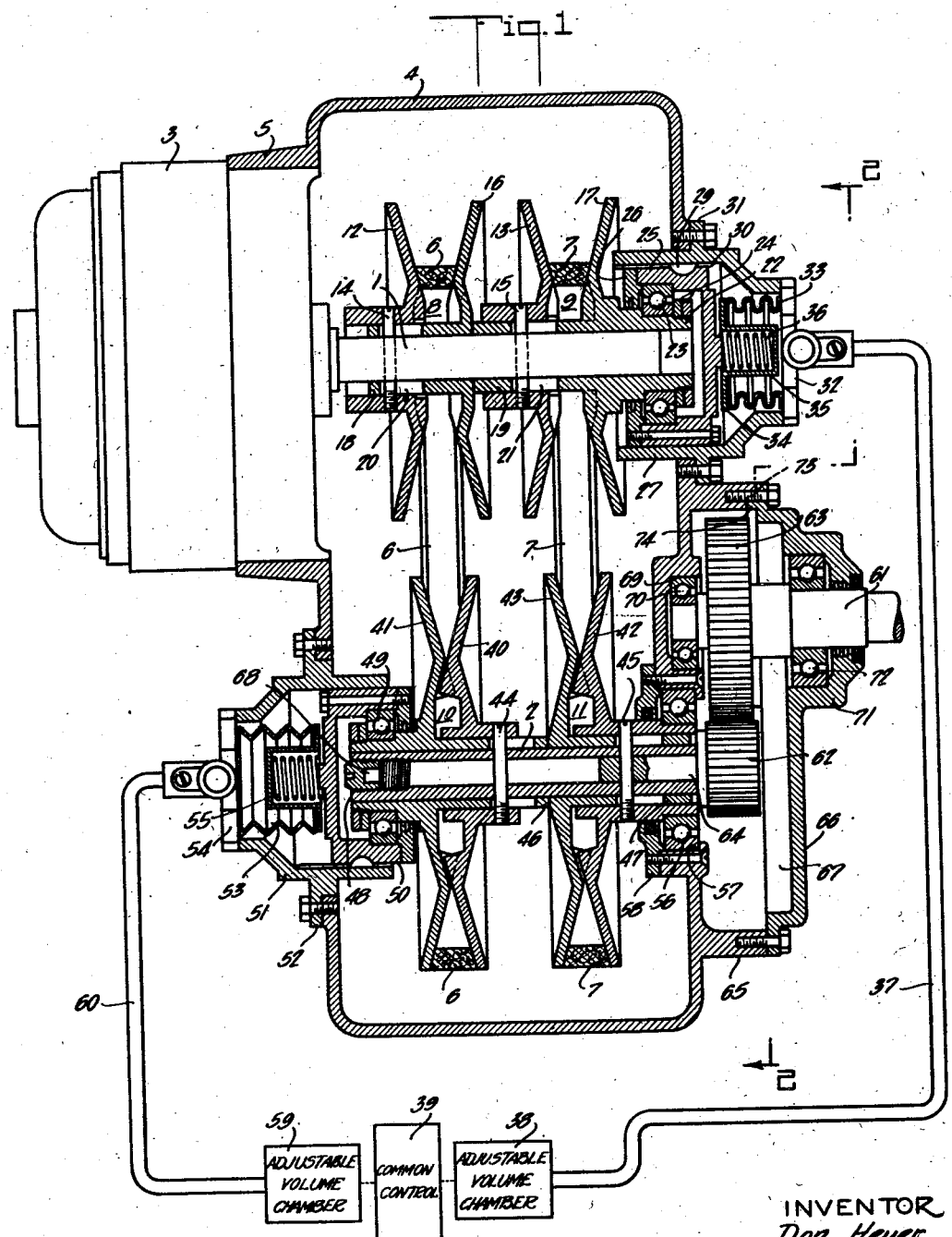

2,256,114

UNITED STATES PATENT OFFICE 2,256,114

VARIABLE SPEED DRIVE WITH MULTIPLE BELTS

Don Heyer, Los Angeles, Calif., assignor to U. S. Electrical Motors, Inc., Los Angeles, Calif., a corporation of California Original application April 22, 1933, Serial No. 667,379. Divided and this application April 22, 1940, Serial No. 330,835

8 Claims. (Cl. 74—230.17)

This invention relates to a variable speed drive utilizing pulley structures of variable effective diameters.

This application is a division of an application filed April 22, 1933, under Serial No. 667,379, and entitled "Variable speed drive with multiple belts," in the name of Don Heyer.

In such variable speed devices, use is made of pullely structures, each having a pair of relatively axially movable members, having inclined opposed faces. The belt is in frictional contact with these faces, and as the faces move together, the belt must move radially outwardly, thus causing the effective pulley diameter to increase. Conversely when the sections move apart, the belt moves inwardly of the pulley, and the diameter is decreased.

Such drives in general are now well-known. It is one of the objects of the present invention to improve in general, this type of drive.

It is apparent that for transmitting heavy power, a heavy pulley structure must be provided, or else a number of pulleys may be used, having a multiple belt arrangement. It is another object of the invention to provide a compact and inexpensive device utilizing multiple belts.

In utilizing such multiple belts and pulleys, it is apparent that the individual pulley structures, making up the belt arrangement, should be capable of accurate and simultaneous adjustment, so that they are all of the same effective diameter at all points of adjustment. It is still another object of my invention to make it possible to cause such adjustment, in a simple and easy manner.

Since the power delivered by a mechanism is a product of speed and torque, it is apparent that for a given power output, the torque can be kept at a small value if the speed is high. The low torque is useful in pulley drives of this character, because then the forces involved are relatively small. Accordingly, an inexpensive design can be used if the pulley devices transmit the power at high speed. Most electric motors operate at a high speed, such as 1800 revolutions per minute, but the load is often of such a nature that a very low speed is desired, with heavy torque characteristics. It is another object of the invention so to correlate the variable speed pulley devices with such a system, as to provide the requisite speed and torque output, while the adjustable pulley devices are themselves operated at an efficient, high speed.

This can be accomplished by connecting the motor shaft directly to the variable pulley structures, and by reducing the resultant speed of the pulley transmission by appropriate gearing, connecting the system to the load.

This invention possesses many other advantages, and has other objects which may be made more easily apparent from a consideration of several embodiments of the invention. For this purpose there are shown a few forms in the drawings accompanying and forming part of the present specification. I shall now proceed to describe these forms in detail, which illustrate the general principles of the invention; but it is to be understood that this detailed description is not to be taken in a limiting sense, since the scope of the invention is best defined by the appended claims.

Referring to the drawings:

Figure 1 is a view, mainly in horizontal section, of one embodiment of the invention, together with a diagrammatic showing of the fluid control mechanism;

Fig. 2 is a side view of the apparatus, with the cover member removed, and taken from the plane 2—2 of Fig. 1; and Figs. 3 and 4 are sectional views showing modifications of the invention.

In Figs. 1 and 2 there is shown a pair of parallel shafts 1 and 2, one of which may be a driving shaft and the other a driven shaft. In the present instance, shaft 1 is shown as extending from a source of power, such an electric motor 3. This electric motor is arranged to be supported adjacent one wall of a casing 4, which is appropriately provided with the extending flange 5 for the accommodation of the outer frame of motor 3.

Casing 4 serves conveniently to form a housing for substantially all of the parts of the system.

Shaft 1 transmits power to shaft 2 by the aid of a plurality of flexible wedge shaped belts 6 and 7, and a plurality of adjustable pulley structures 8, 9, 10 and 11. Each of the adjustable pulley structures includes a pair of relatively axially movable sections having opposed inclined faces. As the faces are brought together the belt is urged upwardly on the incline formed between the two faces and the effective pulley diameter is increased. When it is desired to decrease the ffeective pulley diameter, the sections are permitted to move apart in response to the thrust exerted by the belt.

In the present instance each of the pulley structures 8 and 9 which are carried by shaft 1, has an axially fixed section 12 or 13. The axial anchoring in this instance is provided as by the aid of studs 14, 15 extending through the hubs of sections 12 and 13 and through the shaft 1. The studs 14 and 15, thus serve to provide a drive connection between the sections 12, 13 and the shaft. The corresponding axially movable sections 16 and 17 are each provided with comparatively long hubs 18 and 19. These long hubs respectively telescope inside of the hub of the stationary sections and are freely slidable in the annular space formed between the shaft 1 and the hubs of the fixed sections. In order to key the movable sections 16 and 17 to the shaft 1, while at the same time to permit this axial movement, these hubs 18 and 19 are provided with slots 20 and 21 through which the studs 14 and 15 respectively pass.

It is also to be noted that the end surface of hub 19 contacts with the section 16. In the position shown in Figure 1 the pulley structures 8 and 9 are substantially at their minimum effective diameter settings. In order to increase the effective diameters simultaneously and equally, it is merely necessary to urge pulley section 17 toward the left. This exerts a force on pulley section 16 also to the left. For decreasing the effective pulley diameters, pulley section 17 can be moved to the right; and although pulley section 16 is not positively connected to the hub 19, yet the force exerted by belt 6 will move pulley section 16 to the right and keep it in contact with the end surface of hub 19. It is apparent that section 16 is constrained against free axial movement, by being in contact both with belt 6 and hub 19.

The manner in which section 17 can be axially adjusted is susceptible of wide variation. In the present form a hydraulic system is provided, as in the prior application hereinbefore referred to. To effect this result the movable section 17 has a hub structure 22 extending toward the right over the shaft 1. This hub structure can carry the inner race of a ball thrust bearing 23, which inner race is held tightly by one or more clamp nuts 24, threaded on the end of hub 22. The outer race of the ball bearing structure is tightly held inside of an axially movable support 25 which is of cup shape, and which has a cover member 26 for preventing escape of lubricant from the bearing structure, as well as for preventing the ingress of foreign matter thereto.

The movable support 25 is constrained against rotation inside of a guide 27, as by the aid of a key 29 acting as a spline in a keyway 30, provided on an inner periphery of a stationary member 27. Member 27 is provided with a flange 31 by the aid of which it may be fastened to the wall of casing 4.

It is apparent as thus far described, that the thrust ball bearing 23 serves not only to impart an axial force upon the pulley section 17, but also acts to journal the revolving structure.

Fluid pressure is used to urge the axially movable support 25 to the left. Thus there is a cover member 32 to which is joined in fluid tight relation a corrugated metal bellows 33. The inner end of the metal bellows has a fluid tight cover member 34 with a reentrant portion 35 for the accommodation of a compression spring 36. Fluid fills the corrugated bellows 33 and acts on the right hand end of 36 and may be used to exert a force urging support 25 to the left, by expansion of the bellows 33. The fluid is supplied through a conduit 37 connecting to a controllable or adjustable volume chamber 38. With the system 33, 37, 38 filled with incompressible liquid, such as oil, it is apparent that bellows 33 can be made to expand and contract respectively by the contracting and expanding of the variable volume chamber 38. The adjustable volume chamber 38 can be of the piston and cylinder type, or the metal bellows type, and it can be controlled by any usual mechanical system indicated in general by the rectangle 39. Since the fluid control system can be substantially the same as that disclosed in the prior application referred to, further details of its mode of operation are considered unnecessary. It is sufficient to say that upon expansion of bellows 33 both the movable sections 16 and 17 are urged to increase the effective pulley diameters simultaneously and equally. Upon a contraction of bellows 33 the sections 16 and 17 are permitted to move toward the right to decrease the effective pulley diameters.

The adjustable pulley structures 10 and 11 which are carried on shaft 2 have substantially the same mode of operation as the pulleys just described. Pulley structure 10, which cooperates with pulley structure 8 has a right hand fixed section 40 and a left hand adjustable section 41. Similarly the adjustable pulley structure 11 has a fixed pulley section 42 and an adjustable section 43, and cooperates with pulley structure 9. The arrangement is such that when the effective diameters of structures 8 and 9 are increased the effective diameters of structures 10 and 11 are correspondingly decreased, whereby the belts 6 and 7 are maintained in proper tightened condition. Furthermore, in order to keep the belts 6 and 7 in alignment between the respective pulley structures, the left hand sections 41 and 43 form the adjustable sections. In this way, if the adjustable sections 41 and 43 are moved to the left to decrease the effective pulley diameters the movable sections 16 and 17 are also moved to the left to increase the respective pulley diameters. The belts 6 and 7 then move up on the faces of fixed pulley sections 12 and 13 and down the faces of fixed pulley sections 40 and 42, staying in proper aligned position during this adjustment.

Pulley structures 10 and 11 are indicated as having maximum effective pulley diameters. As before, the fixed sections 40 and 42 are anchored to the shaft 2 as by the studs 44 and 45 which pass through the shaft and through the hubs of these sections. The movable pulley sections 41 and 43 are each provided with the slotted hub 46 and 47 telescoping between the shaft 2 and the fixed sections 40, 42. Motion of the two sections 41 and 43 is caused to be in unison by having the end face of hub 46 contact with the section 43.

Control of the effective pulley diameters of structures 10 and 11 is effected in a manner similar to that described in connection with structures 8 and 9. Thus the hub 48 of the left hand movable pulley section 41 carries the inner race of a thrust ball bearing 49. The outer race is carried by the axially movable cup 50 splined to a stationary support 51. This stationary support 51 can be fastened, as by the aid of a flange 52, to a wall of the casing 4. A metal bellows 53 shown in an expanded position, is fastened to the cover member 54 and acts upon the compression spring 55. This compression spring exerts a force upon the axially movable support 50.

Shaft 2 is supported by the thrust bearings 49 at the left hand end. At the right hand end the rotating structure is supported by a thrust ball bearing structure 56. The inner race of this ball bearing structure is fastened to the hub of the stationary section 42; and the outer race is fastened into an aperture 57 formed in the wall of casing 4. A cover 58 serves to retain the outer race in place as well as to prevent the ingress of foreign matter to the bearing.

The fluid control for the pulley structures 10 and 11 is provided by the adjustable volume chamber 59 connected to bellows 53 by the aid of a conduit 60. The common control 39 can be so arranged that it acts simultaneously on both chamber 38 and 59 to provide simultaneous adjustment of all four adjustable pulley structures. Thus when bellows 53 is expanded bellows 33 is contracted, causing all of the movable sections 16, 17, 41 and 43 to move to the right, thereby causing the effective diameters of structures 8 and 9 to decrease and those of structures 10 and 11 to increase.

In most instances the speed of an electric motor, such as motor 3, is too high even when reduced by the variable speed pulley devices to operate the usual form of load, which requires a comparatively heavy torque and slow speed. The ratio of maximum to minimum speed that can be obtained by the adjustable pulley structures is usually of the order of 3 to 1, but the resultant speeds of shaft 2 would still be too high for effective use. Since it is advisable to operate belts 6 and 7 at as low a torque as possible, the present arrangement as is apparent, provides a comparatively high speed, low torque, load to be transmitted by these belts.

In order to make the power available for heavy torque loads a supplemental reduction gearing is provided by the driven shaft 2 and a load shaft 61. This reduction gearing may include a pinion 62 fastened to shaft 2 and a driven gear 63 fastened to shaft 61. The manner in which these gears are supported will now be described.

Pinion 62 has an axial extension 64 which is pressed tightly into shaft 2 purposely made hollow. Stud 45 also passes through the extension 64 and anchors it positively in place. Pinion 62 as is apparent from Figs. 1 and 2 extends on the outside of casing 4 proper. It is, however, inclosed by the aid of flange 65 and cover 66 in a supplemental housing 67. This supplemental housing encloses the gears 62 and 63.

At times it may be desirable to remove pinion 62, as for replacement or repairs. This can very easily be effected by the aid of fluid pressure. Thus hollow shaft 2 can be filled with an incompressible fluid, such as oil, and this incompressible fluid can be retained by the aid of a threaded plug 68 threaded into the left hand end of shaft 2. If it is desired to express pinion 62, stud 45 is first removed, and plugs used to close the openings in shaft 2. Then plug 68 is screwed in as by a wrench. The resultant fluid pressures obtained inside of the hollow shaft 2 serve to move extension 64 outwardly as a piston.

Shaft 61, to which gear 63 is fastened, is journalled for rotation in two places; in the left hand wall of casing 4 and in the cover 66. Thus the left hand wall of casing 4 has a pocket 69 accommodating the outer race of ball bearing 70. The inner race is fastened to the shaft 61. The cover 66 has a hub 71 which accommodates the outer race of a ball bearing 72. The inner race is held against a shoulder on the shaft 61.

In order to facilitate lining up the bearings 70 and 72 arrangements are made to machine the inner wall of pocket 69 at the same time as a shoulder 73 on flange 65. This shoulder 73 extends nearly around the axis of shaft 71, as indicated in Fig. 2, and serves as a guide for the correspondingly machined projection 74 on cover 66. If shoulder 73 and the inner periphery of pocket 69 be simultaneously machined they are accurately aligned with respect to a common center. Similarly, if the inner periphery of boss 71 and the projection 74 be simultaneously machined then these two elements are also in accurate axial alignment. Accordingly, when the parts are assembled as shown in Fig. 1 there is a certainty that both bearings 70, 72 will be correctly aligned.

It is possible to provide a common fixed member for providing the fixed sections of both pulley structures. One such arrangement is illustrated in Fig. 3. In this case the shaft 94 has fixed thereto an intermediate stationary member 95, as by the aid of a stud 96. This member 95 has inclined faces 97 and 98 on opposite sides thereof. Inclined face 97 cooperates with an adjustable section 99 to form one adjustable pulley structure; and the face 98 cooperates with another adjustable section 100 to form another adjustable pulley structure. In the position shown, the effective pulley diameters are at a minimum, the flexible belts 101 and 102 being drawn inwardly between the respective inclined faces.

The adjustable section 100 has a hub 103, slidable along shaft 94. This adjustable section can be pulled toward the right to increase the effective pulley diameter by the aid of a pair of pull rods 104 and 105. These pull rods extend in a general axial direction and pass through the fixed intermediate section 95. These pull rods can be pulled toward the right by any appropriate mechanism. For example, they may be joined at their right hand end by a stud 106 passing through shaft 94 which is made hollow at the right hand end and provided with slots 107.

While section 100 is moved to the right to increase the effective pulley diameters the section 99 is positively moved to the left to increase the effective pulley diameters of the elements 97—99. To effect this result the adjustable section 99 has a hub 108 extending toward the right and slidable on the shaft 94. Extending in an axial direction from the end of the hub are two studs 109 and 110, each having horizontal extension 111 or 112. As pull rods 104 and 105 are moved toward the right, a pair of levers 113 and 114 are rocked about their stationary pivots 115 and 116. These levers are provided with oppositely directed bifurcated arms respectively engaging extensions 111 or 112, and pin 117 or 118 fixed in the pull rods 104 and 105. The stationary pivots 115 and 116 are supported by the aid of a collar 119 fastened to the shaft 94, and having brackets 120 and 121.

It is apparent that as pull rods 104 and 105 are moved to the right, the section 99 is urged to the left through the intermediary of levers 113 and 114, which act as a reversing mechanism.

In case positive actuation of the two sections 99 and 100 is not desired, spring pressure can be used to move them in opposite direction. Thus a compression spring 120' may be inserted in the hollow portion of shaft 94. At the right hand end it may act against the stud 106 joined to the pull rods 104 and 105. At the left hand end it can act against a pin 121 fastened to the hub of section 99 and passing through slots 122 in shaft 94. It is apparent that spring 120' serves to urge stud 106 and pin 121 apart. Due to the mechanical interlock provided by the levers 113 and 114, it is rendered certain that this resilient force acts equally to move sections 99 and 100 equal distances but in opposite directions.

A simplified form of the type of mechanism shown in Fig. 3 is illustrated in Fig. 4. In this case an intermediate stationary section 123 is fixed to a shaft 124, as by the aid of a set screw 125. The oppositely movable sections 126 and 127 are arranged on opposite sides of section 123. Section 126 can be urged toward the right as by the aid of a pair of splines 127' and 128. These splines are movable in key ways provided in the shaft 124 as well as through the hub of section 123. The right hand end of the splines carry a collar 129 fixed to the splines. A compression spring 130 is coiled around the axis of shaft 124 and has its right hand end against the collar 129. Its left hand end engages the adjustable section 127, which is movable on the splines 127' and 128.

It is apparent that as the flexible belts 131 and 132 move outwardly the spring 130 is permitted to expand. This expansion takes place evenly so that collar 129 and section 127 are moved apart by equal distances. Section 127 thus moves to the left; and collar 129, moving to the right, causes the splines 127', 128 to move to the right, which in turn urge section 127 to the right. Thus both effective diameters are increased. Conversely, when belts 131 and 132 move inwardly toward the axis, both sections 126 and 127 are moved away from the fixed section 123 and spring 130 is compressed, because collar 129 and section 127 move toward each other.

What is claimed is:

1. In a multiple belt variable ratio transmission device, a shaft, a pulley section fixed to the shaft, said pulley section having inclined faces on opposite sides, a pair of movable pulley sections, respectively on opposite sides of the fixed section, each of said movable pulley sections having an inclined face opposed to the corresponding inclined face of the fixed section, and means for simultaneously moving the movable sections toward the fixed section for increasing the effective pulley diameters, comprising a pull rod connected to one movable section and passing through the other sections, and a pivoted lever connecting said pull rod to the other movable section.

2. In a multiple belt variable ratio transmission device, a shaft, a pulley section fixed to the shaft, said pulley section having inclined faces on opposite sides, a pair of movable pulley sections, respectively on opposite sides of the fixed section, each of said movable pulley sections having an inclined face opposed to the corresponding inclined face of the fixed section, and means for simultaneously moving the movable sections toward the fixed section for increasing the effective pulley diameters, comprising a pair of pull rods connected to one movable section, a transverse rod connecting the pull rods and passing through a slot in the shaft, and a pair of levers, each having a stationary axis and oppositely extending arms, one of the arms being associated respectively with the pull rods and the other arm with the other movable section.

3. In a multiple belt variable ratio transmission device, a shaft, a pulley section fixed to the shaft, said pulley section having inclined faces on opposite sides, a pair of movable pulley sections, respectively on opposite sides of the fixed section, each of said movable pulley sections having an inclined face opposed to the corresponding inclined face of the fixed section, and means for simultaneously moving the movable sections toward the fixed section for increasing the effective pulley diameters, comprising means on the shaft extending through the fixed section and engaging one of the movable sections and a resilient means engaging the other movable section as well as the means for urging the first movable section, and exerting a resilient force between them.

4. In a multiple belt variable ratio transmission device, means forming a plurality of adjustable pulleys in common axial driving relation, each of said pulleys having relatively axially movable sections having opposed inclined faces, forming by relative axial adjustment, variable effective pulley diameters, one of the sections for each pulley being formed by a member fixed to a common shaft, the other of the sections being movable axially with respect to the corresponding fixed section, and means for simultaneously adjusting all the movable sections to increase the effective pulley diameters, including bars extending from each movable section to the next movable section, and through an intervening fixed section, said bars being connected to said next section through a reversing mechanism.

5. In a variable ratio transmission, driving and driven shafts, relatively adjustable pulley elements on one of said shafts, a rocker disposed between and operatively connected to said pulley elements for adjusting the same, means coupled to one of said elements to adjust the same and to thereby impart a relative adjustment to the other pulley element through said rocker, and a driving belt operatively connecting said pulley elements with the other of said shafts.

6. In a variable speed transmission, driving and driven shafts, relatively adjustable pulley elements on one of said shafts, a rocker disposed between and operatively connected to said pulley elements for adjusting the same, means coupled to one of said elements to adjust the same to thereby impart a relative adjustment to the other pulley element through said rocker, a plurality of other pulleys mounted on the other shaft for independent longitudinal movement thereon, and driving belts connecting said other pulleys with said pulley elements.

7. In a multiple belt variable ratio transmission, a shaft, a pulley section on the shaft, having inclined faces on opposite sides, a pair of axially movable pulley sections respectively on opposite sides of the fixed section, each of said movable pulley sections having an inclined face opposed to the corresponding inclined face of the fixed section, a resilient member coaxial with the shaft and having an end operatively connected to one of said movable pulley sections, and means forming a connection between the other end of said member and the other movable pulley section, whereby said sections are urged in opposite axial directions by said member.

8. In a multiple belt variable ratio transmission, a shaft, a pulley section on the shaft, having inclined faces on opposite sides, a pair of axially movable pulley sections respectively on opposite sides of the fixed section, each of said movable pulley sections having an inclined face opposed to the corresponding inclined face of the fixed section, a resilient member coaxial with the shaft and having an end operatively connected to one of said movable pulley sections, means forming a connection between the other end of said member and the other movable pulley section, whereby said sections are urged in opposite axial directions by said member, and means including a lever pivotally supported on the shaft for causing the movements of said sections to be equal in amounts and in opposite directions.

DON HEYER.